Patented Jan. 9, 1945

2,366,736

UNITED STATES PATENT OFFICE 2,366,736

ALKYLATION OF ISOPARAFFINS

Carl B. Linn and Vladimir N. Ipatieff, Riverside, Ill., assignors to Universal Oil Products Company, Chicago, Ill., a corporation of Delaware No Drawing. Application December 26, 1942,
Serial No. 470,223

19 Claims. (Cl. 260—683.4)

The present invention relates to the synthesis of hydrocarbons by the interaction of saturated hydrocarbons, particularly isoparaffinic hydrocarbons, with olefinic hydrocarbons in the presence of a novel alkylation catalyst. It is more particularly concerned with the production of substantially saturated gasoline boiling range hydrocarbons having high antiknock values by the alkylation of isoparaffins with normally gaseous mono-olefins.

Numerous catalysts have been proposed for the alkylation of isoparaffinic hydrocarbons with olefinic hydrocarbons including such liquid catalysts as sulfuric acid, phosphoric acid, fluorosulfonic acid, chlorosulfonic acid, hydrogen fluoride, etc. However, these catalysts are not capable of effecting satisfactorily the reaction between isoparaffins and ethylene. Although some of the spirit art catalysts are useful when propylene is employed as the olefinic reactant, nevertheless certain disadvantages are often inherent such as rapid deterioration of the catalyst in the case of sulfuric acid.

In one specific embodiment the present invention comprises a process for the alkylation of isoparaffins with ethylene in the presence of a catalyst consisting essentially of boron trifluoride and an acid fluoride, particularly an alkali metal acid fluoride.

Whereas alkylation catalysts such as sulfuric acid or hydrogen fluoride are useful in the alkylation of isobutane with the higher molecular weight and more reactive mono-olefins, such as amylenes, butylenes, and to a certain extent, propylene, these catalysts are not practical in the alkylation of isobutane with ethylene. Sulfuric acid is particularly unsuitable since even under severe operating conditions most of the ethylene reacts to form ethyl sulfuric acid or diethyl sulfate. However, we have found that a composite of boron trifluoride and an acid fluoride such as sodium or potassium acid fluoride will readily effect alkylation of isoparaffins with ethylene.

The alkylation of isoparaffins, particularly isobutane, with olefinic hydrocarbons is an important step in the production of saturated motor fuels which are useful for aviation purposes. Isobutane is readily available from cracking plant gases, natural gases, and from various hydrocarbon conversion processes. Ethylene is also produced in relatively large quantities in cracking and other hydrocarbon conversion operations. Isobutane and ethylene may be reacted to form valuable hexanes, particularly 2,3-dimethylbutane as well as smaller amounts of other hexanes such as 2,2-dimethylbutane or neohexane. However, the higher homologs of isobutane, such as isopentane, isohexane, etc. are equally useful in the production of higher molecular weight isoparaffins according to the present invention. Although the catalysts of the present invention are particularly applicable when ethylene is employed as the alkylating agent, our invention is broader in scope and the catalyst may be used generally for reacting saturated hydrocarbons including naphthenes and isoparaffinic or other branched chain hydrocarbons containing at least one tertiary carbon atom with either normally gaseous or normally liquid olefinic hydrocarbons, particularly mono-olefins containing from 2 to about 12 carbon atoms per molecule. The term "isoparaffin" as used throughout this specification is intended to include all alkylatable paraffinic hydrocarbons.

Olefinic hydrocarbons which may be employed as alkylating agents within the broad scope of the present invention may be either normally gaseous or normally liquid as hereinbefore described, and in certain instances polymers of the lower boiling olefins may also be employed although not necessarily under the same operating conditions. For example, when olefinic polymers are reacted with isoparaffins it is generally desirable to employ a somewhat higher molal ratio of isoparaffin to olefin in the hydrocarbon charging stock than would ordinarily be used when monomeric olefinic reactants are employed. It is also possible to employ mixtures of normally gaseous and normally liquid reactants or hydrocarbon fractions which contain appreciable amounts of normal paraffins or naphthenes.

Boron trifluoride alone is not an alkylation catalyst, but if hydrogen fluoride is present in addition to the boron trifluoride, satisfactory alkylation may be obtained. In certain cases water and boron trifluoride will catalyze the alkylation of isoparaffins with olefins although not necessarily under the same operating conditions or with the same results as are obtained when boron trifluoride and hydrogen fluoride are charged to the process. The acid fluorides alone are also inactive as alkylating catalysts.

The alkylation of naphthenic or isoparaffinic hydrocarbons with olefinic hydrocarbons in the presence of the boron trifluoride-alkali metal acid fluoride catalyst may be carried out at a temperature of from about 0° C. to about 100° C. although a more preferable operating range is from about 10° C. to about 50° C. It is highly desirable that the reaction be carried out under sufficient pressure to maintain a substantial portion of the reactants in the liquid phase, for example, from about 10 to about 200 atmospheres dependent upon the amount of boron trifluoride present, the temperature of the reaction, and upon other factors. In order to minimize polymerization of the olefinic reactants, the hydrocarbon feed to the alkylation reaction zone should contain a substantial excess of saturated hydrocarbon reactants over olefinic hydrocarbons, for example, a molal ratio of isoparaffins to olefins of from about 3:1 to about 15:1 or higher. If desired, olefinic reactants may be introduced at spaced points throughout the alkylation zone in order to maintain the desired high isoparaffin to olefin ratio.

At atmospheric pressure and ordinary temperatures boron trifluoride is a colorless gas having a boiling point of —101° C. In general the acid fluorides are solid materials which, however, decompose at relatively high temperatures. The preferred compounds are the acid fluorides of the alkali metals, i. e., the acid fluorides of lithium, sodium, potassium, rubidium, and caesium. The acid fluorides are sometimes referred to as hydrofluorides and are often represented by formulae such as the following: KF.HF, KF.2HF, and KF.3HF. In general the mono hydrofluorides are more stable and are therefore preferred, but under proper operating conditions the di- and trihydrofluorides may also be used. The stability of the mono acid fluorides or hydrofluorides of the alkali metals decreases in the following order: sodium, potassium, rubidium and caesium. It is therefore preferred that the acid fluorides of sodium and potassium be used. It will be apparent that the exact range of operating temperatures and pressures to be used in the alkylation reaction will depend somewhat upon the particular acid fluoride which is employed and it should therefore be noted that the various acid fluorides are not necessarily on an equivalent basis.

The alkylation method of the present invention may be conducted in a batch operation or more preferably in a continuous operation. The most convenient method of operation consists in employing a catalyst chamber containing solid granules or preformed pills of the solid acid fluoride. The isoparaffinic and olefinic reactants along with boron trifluoride are then passed through the catalyst chamber at alkylating conditions of pressure, temperature, and reaction time. Boron trifluoride may be separated from the hydrocarbon reaction products and recycled to the alkylation zone for reuse. The boron trifluoride may be introduced to the alkylation chamber separately from the hydrocarbon reactants, or, more conveniently, it may be introduced in solution in the isobutane. The fixed bed of potassium or sodium acid fluoride may be maintained in one or a plurality of reaction zones as desired. The acid fluoride granules may be present alone or the acid fluoride may be supported on or composited with a suitable carrying medium or other substantially inert filler or binder for the granules or pilled particles. In another method of operation, the alkylation zone may comprise a mechanically agitated zone in which finely divided potassium acid fluoride is agitated in the form of slurry with the hydrocarbon reactants and boron trifluoride. It will usually be necessary to incorporate a cooling zone or other heat exchange means in the alkylation zone, or between stages if a multiple zone system is employed, in order to control the exothermic alkylation reaction.

In the case of the preferred operation wherein potassium or sodium acid fluoride is maintained as a fixed bed, the effluent material from the alkylation zone is introduced into a separation step wherein hydrocarbon reaction products are separated from boron trifluoride which can then be recycled to the alkylation stage as hereinbefore described. The hydrocarbon reaction products are fractionated to separate desired alkylation products from unconverted isoparaffins. The latter are recycled to the alkylation zone in order to maintain the desired high isoparaffin to olefin ratio in the hydrocarbon feed stock. Light hydrocarbon contaminants in the charging stock to the process may also be removed in the fractionation step in order to prevent their accumulation in the alkylation system. For example, if appreciable amounts of ethane, propane, or normal butane are introduced with the fresh hydrocarbon feed it will be desirable to remove these constituents during the fractionation operation. In general it is not intended to limit the broad scope of the present invention to any particular method of contacting the catalyst and the reactants.

The following specific example is introduced in order to illustrate the nature of the present invention as it is applied to the alkylation of isobutane with ethylene.

About 50 grams of potassium acid fluoride (KF.HF) was charged into a mechanically agitated reaction vessel which was then sealed. A total of 224 grams of the isobutane was introduced to the reaction zone and 55 grams of gaseous boron trifluoride was added under pressure. The stirring device was started and the temperature throughout the run was controlled at 32° C. Ethylene was added to the reaction mixture throughout the course of the run from a weighed duraluminum cylinder in sufficient quantities to maintain an average pressure of 275 pounds per square inch gauge. At the end of the run the contents of the reaction vessel were discharged into another vessel and pressure was then released through a "train" containing an alkali scrubber, a calcium chloride drying tower, and receivers cooled to —80° C. After the unreacted ethylene and isobutane were thus released the remaining liquid product was distilled.

The liquid product comprising $C_5$ and heavier hydrocarbons weighed 240 grams and there was also obtained 110 grams of condensable gas having the following analysis:

| | Mol per cent |
|---|---|
| Ethylene | 4.9 |
| Ethane | 0.5 |
| Propylene | 1.6 |
| Propane | 10.6 |
| Butanes | 74.7 |
| $C_{5+}$ | 7.7 |

The ASTM octane number of the liquid product was 85 and it had a bromine number of less than 1. The distillation data on the liquid product indicated that 66 volume per cent of the material boiled below 300° F.

The novelty and utility of this invention are evident from the preceding specification and example although neither section is intended to place undue limitations on the generally broad scope of the invention.

We claim as our invention:

1. A process for the synthesis of hydrocarbons which comprises reacting an alkylatable saturated hydrocarbon with an olefinic hydrocarbon under alkylating conditions in the presence of boron trifluoride and an acid fluoride.

2. A process for the alkylation of isoparaffinic hydrocarbons with olefinic hydrocarbons which comprises contacting isoparaffins and olefins at a temperature of from about 0° C. to about 100° C. in the presence of boron trifluoride and an acid fluoride.

3. A process for the production of substantially saturated motor fuel which comprises reacting an isoparaffin with an olefin under alkylating conditions in the presence of boron trifluoride and an acid fluoride.

4. The process of claim 1 wherein said acid fluoride comprises an acid fluoride of an alkali metal.

5. A process for the synthesis of hydrocarbons which comprises alkylating an isoparaffin with an olefin in the presence of a catalyst consisting essentially of boron trifluoride and an alkali metal acid fluoride at a temperature of from about 10° C. to about 50° C.

6. A process for the synthesis of hydrocarbons which comprises reacting an isoparaffinic hydrocarbon with an olefinic hydrocarbon under alkylating conditions in the presence of a catalyst consisting essentially of boron trifluoride and potassium acid fluoride.

7. A process for the synthesis of hydrocarbons which comprises reacting an isoparaffinic hydrocarbon with an olefinic hydrocarbon under alkylating conditions in the presence of a catalyst consisting essentially of boron trifluoride and sodium acid fluoride.

8. A process for the synthesis of hydrocarbons which comprises alkylating isobutane with ethylene in the presence of a catalyst consisting essentially of boron trifluoride and an alkali metal acid fluoride.

9. A process for the synthesis of hydrocarbons which comprises alkylating isobutane with propylene in the presence of a catalyst consisting essentially of boron trifluoride and an alkali metal acid fluoride.

10. A process for the synthesis of hydrocarbons which comprises alkylating isobutane with butylene in the presence of a catalyst consisting essentially of boron trifluoride and an alkali metal acid fluoride.

11. A process for the production of hexanes which comprises reacting isobutane with ethylene at a temperature of from about 10° C. to about 50° C. under a pressure sufficient to maintain a substantial portion of the reactants in the liquid phase in the presence of an alkylating catalyst consisting essentially of boron trifluoride and an alkali metal acid fluoride.

12. A process for the production of 2,3-dimethylbutane which comprises alkylating isobutane with ethylene in the presence of a catalyst consisting essentially of boron trifluoride and an alkali metal acid fluoride at a temperature of from about 10° C. to about 50° C. under a pressure sufficient to maintain a substantial portion of the reactants in the liquid phase and while maintaining a substantial molar excess of isoparaffin over olefin in the hydrocarbon feed to the alkylation zone.

13. A process for the production of 2,3-dimethylbutane which comprises alkylating isobutane with ethylene in the presence of a catalyst consisting essentially of boron trifluoride and potassium acid fluoride.

14. A process for the production of 2,3-dimethylbutane which comprises alkylating isobutane with ethylene in the presence of a catalyst consisting essentially of boron trifluoride and sodium acid fluoride.

15. A process for the synthesis of branched chain hydrocarbons which comprises reacting an isoparaffin with an olefin under alkylating conditions in the presence of a catalyst consisting essentially of boron trifluoride and an alkali metal mono hydrofluoride.

16. A process for the synthesis of branched chain hydrocarbons which comprises passing isoparaffinic hydrocarbons, olefinic hydrocarbons, and boron trifluoride through an alkylation zone containing therein a fixed bed of a solid contact material comprising an alkali metal acid fluoride, separating boron trifluoride from the hydrocarbon reaction products, recycling said boron trifluoride to the alkylation zone and fractionating said hydrocarbon reaction products to recover desired alkylation products.

17. The process of claim 16 wherein said solid contact material consists essentially of potassium acid fluoride as its active ingredient.

18. The process of claim 16 wherein said solid contact material consists essentially of sodium acid fluoride as its active ingredient.

19. An alkylation process which comprises reacting a branched chain paraffin with an olefin in the presence of boron trifluoride and an alkali metal acid fluoride.

CARL B. LINN.
VLADIMIR N. IPATIEFF.